(12) United States Patent
Bush

(10) Patent No.: US 12,676,133 B2
(45) Date of Patent: Jul. 7, 2026

(54) NONWOVEN INFRARED REFLECTIVE FIBER MATERIALS

(71) Applicant: Zephyros, Inc., Romeo, MI (US)

(72) Inventor: Kendall Bush, Macomb, MI (US)

(73) Assignee: Zephyros, Inc., Romeo, MI (US)

( * ) Notice: Subject to any disclaimer, the term of this patent is extended or adjusted under 35 U.S.C. 154(b) by 82 days.

(21) Appl. No.: 15/549,807

(22) PCT Filed: Feb. 15, 2016

(86) PCT No.: PCT/US2016/017941
§ 371 (c)(1),
(2) Date: Aug. 9, 2017

(87) PCT Pub. No.: WO2016/131035
PCT Pub. Date: Aug. 18, 2016

(65) Prior Publication Data
US 2018/0047380 A1 Feb. 15, 2018

Related U.S. Application Data

(60) Provisional application No. 62/116,067, filed on Feb. 13, 2015.

(51) Int. Cl.
G10K 11/168 (2006.01)
B32B 3/26 (2006.01)
(Continued)

(52) U.S. Cl.
CPC ............ G10K 11/168 (2013.01); B32B 3/266 (2013.01); B32B 5/022 (2013.01); B32B 5/028 (2013.01);
(Continued)

(58) Field of Classification Search
None
See application file for complete search history.

(56) References Cited

U.S. PATENT DOCUMENTS

| | | |
|---|---|---|
| 3,061,491 A | 10/1962 | Sherrard |
| 3,087,571 A | 4/1963 | Kerwin, Jr. |

(Continued)

FOREIGN PATENT DOCUMENTS

| | | |
|---|---|---|
| AU | 782550 B2 | 1/2001 |
| AU | 2005203796 A1 | 10/2005 |

(Continued)

OTHER PUBLICATIONS

Merriam-Webster, Loft, https://www.merriam-webster.com/dictionary/loft, accessed on Oct. 11, 2019. (Year: 2019).*

(Continued)

*Primary Examiner* — Marla D Mcconnell
*Assistant Examiner* — Christine X Nisula
(74) *Attorney, Agent, or Firm* — The Dobrusin Law Firm, P.C.; Katherine P. Pacynski

(57) ABSTRACT

An acoustic material including a lofted porous absorber layer and a facing layer. The lofted porous absorber layer may include polymeric fibers having a metallic coating for impeding heat transfer. The acoustic material may also include an optional adhesive layer, an optional pressure sensitive adhesive layer, or both. An acoustic material may be assembled using a method including coating a plurality of polymeric fibers with a metallic coating; forming a lofted porous absorber layer including the polymeric fibers; and adhering a facing layer onto a first surface of the absorber layer.

20 Claims, 2 Drawing Sheets

(51) Int. Cl.

| | |
|---|---|
| *B32B 5/02* | (2006.01) |
| *B32B 5/18* | (2006.01) |
| *B32B 7/06* | (2019.01) |
| *B32B 7/12* | (2006.01) |
| *B32B 7/14* | (2006.01) |
| *B32B 15/14* | (2006.01) |
| *B32B 15/20* | (2006.01) |
| *B32B 27/12* | (2006.01) |

(52) U.S. Cl.

CPC .................. *B32B 5/18* (2013.01); *B32B 7/06* (2013.01); *B32B 7/12* (2013.01); *B32B 7/14* (2013.01); *B32B 15/14* (2013.01); *B32B 15/20* (2013.01); *B32B 27/12* (2013.01); *B32B 2255/02* (2013.01); *B32B 2255/205* (2013.01); *B32B 2262/02* (2013.01); *B32B 2262/06* (2013.01); *B32B 2307/102* (2013.01); *B32B 2307/304* (2013.01); *B32B 2307/416* (2013.01); *B32B 2307/724* (2013.01); *B32B 2309/105* (2013.01); *B32B 2419/00* (2013.01); *B32B 2605/00* (2013.01)

(56) References Cited

U.S. PATENT DOCUMENTS

| | | | |
|---|---|---|---|
| 3,160,549 A | | 12/1964 | Caldwell et al. |
| 3,193,049 A | | 7/1965 | Wollek |
| 3,205,972 A | | 9/1965 | Stricker |
| 3,214,323 A | | 10/1965 | Russell et al. |
| 3,386,527 A | | 6/1968 | Daubert et al. |
| 3,523,859 A | | 8/1970 | Komp |
| 3,642,554 A | | 2/1972 | Hensley |
| 3,899,380 A | | 8/1975 | Pihlstrom |
| 3,978,179 A | | 8/1976 | Sundhauss |
| 3,994,363 A | | 11/1976 | Hirao et al. |
| 4,050,913 A | | 9/1977 | Roach |
| 4,096,007 A | | 6/1978 | Braunling |
| 4,129,675 A | | 12/1978 | Scott |
| 4,131,664 A | | 12/1978 | Flowers et al. |
| 4,152,474 A | | 5/1979 | Cook et al. |
| 4,287,255 A | | 9/1981 | Wong et al. |
| 4,299,223 A | | 11/1981 | Cronkrite |
| 4,392,522 A | | 7/1983 | Bschorr |
| 4,399,851 A | | 8/1983 | Bschorr |
| 4,705,715 A | | 11/1987 | DeCoste, Jr. et al. |
| 4,830,140 A | | 5/1989 | Fridh et al. |
| 4,888,234 A | | 12/1989 | Smith et al. |
| 4,933,129 A | * | 6/1990 | Huykman ............... D06M 11/83 |
| | | | 19/296 |
| 4,988,551 A | | 1/1991 | Zegler |
| 5,004,549 A | | 4/1991 | Wood et al. |
| 5,068,001 A | | 11/1991 | Huassling |
| 5,128,386 A | | 7/1992 | Rehmer et al. |
| 5,298,694 A | | 3/1994 | Thmpson et al. |
| 5,401,567 A | | 3/1995 | Knobloch |
| 5,410,111 A | | 4/1995 | Stief et al. |
| 5,459,291 A | | 10/1995 | Haines et al. |
| 5,492,580 A | | 2/1996 | Frank |
| 5,493,081 A | | 2/1996 | Manigold |
| 5,496,603 A | | 3/1996 | Riedel et al. |
| 5,504,282 A | | 4/1996 | Pizzirusso et al. |
| 5,550,338 A | | 8/1996 | Hielscher |
| 5,560,204 A | | 10/1996 | Ishihama et al. |
| 5,613,942 A | | 3/1997 | Lucas et al. |
| 5,635,270 A | | 6/1997 | Fletcher |
| 5,721,177 A | | 2/1998 | Frank |
| 5,733,824 A | | 3/1998 | Brunka et al. |
| 5,736,470 A | | 4/1998 | Schneberger et al. |
| 5,741,829 A | | 4/1998 | Reich et al. |
| 5,745,434 A | | 4/1998 | Cushman |
| 5,747,131 A | | 5/1998 | Kreckel |
| 5,773,080 A | | 6/1998 | Simmons et al. |
| 5,773,375 A | | 6/1998 | Swan et al. |

| | | | |
|---|---|---|---|
| 5,824,973 A | | 10/1998 | Haines et al. |
| 5,832,685 A | | 11/1998 | Hermanson |
| 5,841,081 A | | 11/1998 | Thompson et al. |
| 5,861,348 A | | 1/1999 | Kase |
| 5,866,235 A | | 2/1999 | Fredrick et al. |
| 5,886,306 A | | 3/1999 | Patel et al. |
| 5,906,883 A | | 5/1999 | Blanc-Brude |
| 5,955,174 A | | 9/1999 | Wadsworth et al. |
| 5,968,629 A | | 10/1999 | Masui et al. |
| 5,981,411 A | | 11/1999 | Brown |
| 6,008,149 A | | 12/1999 | Copperwheat |
| 6,048,809 A | | 4/2000 | Brow et al. |
| 6,102,465 A | | 8/2000 | Nemoto et al. |
| 6,103,180 A | | 8/2000 | Haeseker et al. |
| 6,145,617 A | | 11/2000 | Alts |
| 6,165,921 A | | 12/2000 | Nagata et al. |
| 6,198,016 B1 | | 3/2001 | Lucast et al. |
| 6,204,209 B1 | | 3/2001 | Rozek et al. |
| 6,220,388 B1 | | 4/2001 | Sanborn |
| 6,238,761 B1 | | 5/2001 | Jeong et al. |
| 6,244,314 B1 | | 6/2001 | Dodt et al. |
| 6,256,600 B1 | | 7/2001 | Bolton et al. |
| 6,296,075 B1 | | 10/2001 | Gish et al. |
| 6,312,542 B1 | | 11/2001 | Nagata et al. |
| 6,345,688 B1 | | 2/2002 | Veen et al. |
| 6,376,396 B1 | | 4/2002 | Thorn et al. |
| 6,378,179 B1 | | 4/2002 | Hirsch |
| 6,390,563 B1 | | 5/2002 | Haverkamp et al. |
| 6,410,464 B1 | | 6/2002 | Menzies et al. |
| 6,419,729 B1 | | 7/2002 | Duffy et al. |
| 6,429,154 B1 | | 8/2002 | Trotter |
| 6,495,229 B1 | | 12/2002 | Carte et al. |
| 6,514,889 B1 | | 2/2003 | Theoret et al. |
| 6,524,691 B2 | | 2/2003 | Sugawara et al. |
| 6,534,145 B1 | | 3/2003 | Boyles |
| 6,541,105 B1 | | 4/2003 | Park |
| 6,598,636 B1 | | 7/2003 | Schurmann et al. |
| 6,755,483 B2 | | 6/2004 | Yukawa et al. |
| 6,821,597 B1 | | 11/2004 | Price et al. |
| 6,913,718 B2 | | 7/2005 | Ducker et al. |
| 7,201,253 B2 | | 4/2007 | Duval et al. |
| 7,226,656 B2 | | 6/2007 | Coates et al. |
| 7,470,339 B2 | | 12/2008 | Hoffmann et al. |
| 7,514,026 B1 | | 4/2009 | Zafiroglu |
| 7,757,810 B2 | | 7/2010 | Sparks et al. |
| 7,757,811 B2 | | 7/2010 | Fox et al. |
| 7,867,601 B2 | | 1/2011 | Ikishima et al. |
| 8,153,219 B2 | | 4/2012 | Hooft |
| 8,365,862 B2 | | 2/2013 | Coates et al. |
| 8,534,419 B2 | | 9/2013 | Coates et al. |
| 2001/0000162 A1 | | 4/2001 | Fletemier et al. |
| 2001/0015249 A1 | | 8/2001 | Mohr |
| 2001/0023008 A1 | | 9/2001 | Offermann et al. |
| 2002/0011306 A1 | | 1/2002 | Hannington et al. |
| 2002/0015842 A1 | | 2/2002 | Yanagiuchi |
| 2002/0033215 A1 | | 3/2002 | Aoki |
| 2002/0086599 A1 | * | 7/2002 | McNally ................... B32B 5/02 |
| | | | 442/117 |
| 2003/0066708 A1 | | 4/2003 | Allison et al. |
| 2003/0068943 A1 | | 4/2003 | Fay |
| 2003/0099810 A1 | | 5/2003 | Allison et al. |
| 2003/0188817 A1 | | 10/2003 | Yukawa et al. |
| 2004/0021247 A1 | | 2/2004 | Habisreitinger et al. |
| 2004/0077738 A1 | | 4/2004 | Field et al. |
| 2004/0111817 A1 | | 6/2004 | Chen et al. |
| 2004/0131836 A1 | | 7/2004 | Thompson |
| 2004/0173298 A1 | | 9/2004 | Boiocchi et al. |
| 2004/0176003 A1 | | 9/2004 | Yang et al. |
| 2004/0180177 A1 | | 9/2004 | Ray et al. |
| 2004/0180592 A1 | | 9/2004 | Ray |
| 2004/0231915 A1 | | 11/2004 | Thompson, Jr. et al. |
| 2004/0238275 A1 | * | 12/2004 | Keller .................. G10K 11/162 |
| | | | 181/286 |
| 2005/0084641 A1 | | 4/2005 | Downs et al. |
| 2005/0211358 A1 | | 9/2005 | Tanno |
| 2005/0263345 A1 | * | 12/2005 | Erickson ............. B60R 13/0815 |
| | | | 181/290 |
| 2006/0090958 A1 | | 5/2006 | Coates et al. |
| 2006/0105664 A1 | | 5/2006 | Zafiroglu |

(56) References Cited

U.S. PATENT DOCUMENTS

| | | | |
|---|---|---|---|
| 2006/0124387 A1 | 6/2006 | Berbner et al. | |
| 2006/0137799 A1* | 6/2006 | Haque | B60R 13/08 |
| | | | 156/182 |
| 2006/0225952 A1* | 10/2006 | Takayasu | G10K 11/162 |
| | | | 181/294 |
| 2006/0289230 A1 | 12/2006 | Connelly et al. | |
| 2006/0289231 A1* | 12/2006 | Priebe | B32B 3/266 |
| | | | 181/290 |
| 2007/0190871 A1 | 8/2007 | Patel | |
| 2007/0245664 A1* | 10/2007 | Orologio | B32B 27/36 |
| | | | 52/508 |
| 2007/0277948 A1 | 12/2007 | Carbo et al. | |
| 2008/0001431 A1 | 1/2008 | Thompson et al. | |
| 2008/0050565 A1 | 2/2008 | Gross et al. | |
| 2008/0064794 A1 | 3/2008 | Murdock et al. | |
| 2008/0073146 A1 | 3/2008 | Thompson et al. | |
| 2008/0166940 A1 | 7/2008 | Nunn et al. | |
| 2008/0233348 A1 | 9/2008 | Ishiwatari et al. | |
| 2008/0251187 A1 | 10/2008 | Haque et al. | |
| 2008/0296087 A1 | 12/2008 | Hiroyasu et al. | |
| 2008/0311363 A1 | 12/2008 | Haskett et al. | |
| 2009/0071322 A1 | 3/2009 | Oxford et al. | |
| 2009/0148644 A1 | 6/2009 | Francis | |
| 2009/0162595 A1 | 6/2009 | Ko et al. | |
| 2009/0173569 A1* | 7/2009 | Levit | E04B 1/8409 |
| | | | 181/286 |
| 2009/0197044 A1* | 8/2009 | Pelzer | B32B 15/046 |
| | | | 428/138 |
| 2009/0255619 A1 | 10/2009 | Tong | |
| 2010/0000640 A1 | 1/2010 | Kierzkowski et al. | |
| 2010/0021667 A1 | 1/2010 | Yanagawa | |
| 2010/0168286 A1 | 7/2010 | Gladfelter et al. | |
| 2010/0224438 A1* | 9/2010 | Schulze | B60R 13/08 |
| | | | 181/204 |
| 2010/0270101 A1 | 10/2010 | Yukawa | |
| 2010/0304109 A1 | 12/2010 | Schilling et al. | |
| 2011/0004414 A1 | 1/2011 | McKim | |
| 2011/0070794 A1 | 3/2011 | Gladfelter | |
| 2011/0082386 A1 | 4/2011 | Sheraton, Sr. | |
| 2011/0139543 A1* | 6/2011 | Coates | E04B 1/7662 |
| | | | 156/308.2 |
| 2011/0159236 A1 | 6/2011 | Nakae et al. | |
| 2011/0226547 A1 | 9/2011 | Kühl et al. | |
| 2011/0274921 A1 | 11/2011 | Li et al. | |
| 2011/0293911 A1* | 12/2011 | Coates | D04H 1/5412 |
| | | | 427/180 |
| 2012/0024626 A1* | 2/2012 | Coates | B32B 37/1284 |
| | | | 181/294 |
| 2012/0037447 A1 | 2/2012 | Deval et al. | |
| 2012/0058289 A1 | 3/2012 | Coates et al. | |
| 2013/0049406 A1* | 2/2013 | Hasl | B62D 21/17 |
| | | | 296/203.02 |
| 2013/0112499 A1 | 5/2013 | Kitchen et al. | |
| 2013/0134735 A1* | 5/2013 | Shives | B60R 13/0846 |
| | | | 181/211 |
| 2013/0192921 A1 | 8/2013 | Coates et al. | |
| 2013/0327590 A1 | 12/2013 | Grube et al. | |
| 2014/0014439 A1* | 1/2014 | Coates | B32B 37/1284 |
| | | | 156/60 |
| 2014/0050886 A1* | 2/2014 | Burgin | B29D 99/0021 |
| | | | 428/138 |
| 2015/0184374 A1* | 7/2015 | Kang | E04B 1/84 |
| | | | 181/290 |
| 2015/0364730 A1 | 12/2015 | Glaspie | |

FOREIGN PATENT DOCUMENTS

| | | | |
|---|---|---|---|
| CA | 2350477 A1 | 5/2000 | |
| CA | 2421458 A1 | 4/2004 | |
| CN | 1993731 A | 7/2007 | |
| CN | 102234794 A | 11/2011 | |
| DE | 6930307 U | 12/1969 | |
| DE | 19508335 A1 | 11/1995 | |
| DE | 4424328 A1 | 1/1996 | |
| DE | 10345575 B3 | 1/2005 | |
| DE | 102004016934 A1 | 10/2005 | |
| DE | 19714348 A1 | 2/2008 | |
| DE | 102011079413 A1 | 1/2013 | |
| EP | 0607946 B1 | 7/1994 | |
| EP | 0909680 A1 | 4/1999 | |
| EP | 0911185 A2 | 4/1999 | |
| EP | 0949066 A2 | 10/1999 | |
| EP | 1577123 B1 | 9/2005 | |
| EP | 1640207 A1 | 3/2006 | |
| EP | 1775714 A1 | 4/2007 | |
| EP | 2312073 A1 | 4/2011 | |
| GB | 823203 A | 11/1959 | |
| GB | 2079626 A | 1/1982 | |
| GB | 2322862 A | 9/1998 | |
| GB | 2421251 A | 6/2006 | |
| JP | S56-38080 A | 9/1982 | |
| JP | S60-137528 U | 9/1985 | |
| JP | 63-11541 U | 1/1988 | |
| JP | 02302484 A | 12/1990 | |
| JP | H05-113020 A | 7/1993 | |
| JP | 7266802 A | 10/1995 | |
| JP | H08-223855 A | 8/1996 | |
| JP | H10-121597 A | 5/1998 | |
| JP | H10-156994 A | 6/1998 | |
| JP | H10148909 A | 6/1998 | |
| JP | H10237978 A | 9/1998 | |
| JP | H10-273900 A | 10/1998 | |
| JP | H10280259 A | 10/1998 | |
| JP | H11508328 A | 7/1999 | |
| JP | 2000-310023 A | 7/2000 | |
| JP | 2001-228879 A | 8/2001 | |
| JP | 2001-348540 A | 12/2001 | |
| JP | 2002-052634 A | 2/2002 | |
| JP | 2002-067608 A | 3/2002 | |
| JP | 2004-107605 | 8/2004 | |
| JP | 2004-291549 A | 10/2004 | |
| JP | 2005-036364 A | 2/2005 | |
| JP | 2005-076144 A | 3/2005 | |
| JP | 2006-104298 A | 4/2006 | |
| JP | 2006-143867 A | 6/2006 | |
| JP | 2006160197 A1 | 6/2006 | |
| JP | 2006-193838 A | 7/2006 | |
| JP | 2006-273909 A | 10/2006 | |
| JP | 2007-025044 A | 1/2007 | |
| JP | 2007-512990 A | 5/2007 | |
| JP | 2007-223273 A | 6/2007 | |
| JP | 2008-068799 A | 3/2008 | |
| JP | 2008-132972 A | 6/2008 | |
| WO | 8809406 A1 | 12/1988 | |
| WO | 93/23596 A1 | 11/1993 | |
| WO | 94/03343 A1 | 2/1994 | |
| WO | 95/25634 A1 | 9/1995 | |
| WO | 97/00989 A1 | 1/1997 | |
| WO | 97/04445 A1 | 2/1997 | |
| WO | 98/18656 A1 | 5/1998 | |
| WO | 98/38370 A1 | 9/1998 | |
| WO | 98/53444 A1 | 11/1998 | |
| WO | 99/61963 A1 | 12/1999 | |
| WO | 0027671 A1 | 5/2000 | |
| WO | 2000/032142 A1 | 6/2000 | |
| WO | 00/53456 A1 | 9/2000 | |
| WO | 2001/019306 A1 | 3/2001 | |
| WO | 0209089 A1 | 1/2002 | |
| WO | 02085648 A1 | 10/2002 | |
| WO | 02098643 A2 | 12/2002 | |
| WO | 2003/000976 A1 | 1/2003 | |
| WO | 03069596 A1 | 8/2003 | |
| WO | 03074267 A1 | 9/2003 | |
| WO | 03/097227 A1 | 11/2003 | |
| WO | 2005/081226 A1 | 9/2005 | |
| WO | WO-2006083144 A1 * | 8/2006 | ......... B60R 13/0815 |
| WO | 2006/107847 A2 | 10/2006 | |
| WO | 2007/125830 A1 | 8/2007 | |
| WO | 2009/039900 A1 | 4/2009 | |
| WO | 2010/042995 A1 | 4/2010 | |
| WO | 2010/063079 A1 | 6/2010 | |

(56)        References Cited

FOREIGN PATENT DOCUMENTS

| WO | 2010/094897 A2 | 8/2010 |
| WO | 2012/038737 A1 | 3/2012 |
| WO | 2017028962 A1 | 2/2017 |

OTHER PUBLICATIONS

Fabric Link, Loft, https://www.fabriclink.com/Dictionaries/Textile. cfm#L, accessed on Oct. 11, 2019. (Year: 2019).*

Temperature and the Speed of Sound, https://www.nde-ed.org/ EducationResources/HighSchool/Sound/tempandspeed.htm., accessed on Oct. 11, 2019 (Year: 2019).*

Peng, L. Sound absorption and insulation functional composites. Retrieved Jan. 7, 2021, from https://www.sciencedirect.com/science/ article/pii/B9780081004111000133 (Year: 2016).*

International Search Report and Written Opinion for International Patent Application No. PCT/US2016/017941, dated May 4, 2016.

Acoustic Textiles-Lighter, Thinner and More Sound-Absorbent, Technical Textiles International, International Newsletters, dated Sep. 2002, pp. 15-18.

Bies Reference 1 of 7; Engineering Noise Control Theory and Practice; 3$^{rd}$ Edition (2003).

Bies Reference 2 of 7; Engineering Noise Control Theory and Practice; 3$^{rd}$ Edition (2003).

Bies Reference 3 of 7; Engineering Noise Control Theory and Practice; 3$^{rd}$ Edition (2003).

Bies Reference 4 of 7; Engineering Noise Control Theory and Practice; 3$^{rd}$ Edition (2003).

Bies Reference 5 of 7; Engineering Noise Control Theory and Practice; 3$^{rd}$ Edition (2003).

Bies Reference 6 of 7; Engineering Noise Control Theory and Practice; 3$^{rd}$ Edition (2003).

Bies Reference 7 of 7; Engineering Noise Control Theory and Practice; 3$^{rd}$ Edition (2003).

Deci-Tex 3D, URL = http:archive.org/web/20070830042658http:// www.inccorp.com.au/page/deci_tex_3d.html#top, including nine (9) documents from links therein, download date Aug. 26, 2011.

Natural Fiber Based Lightweight Sound Absorber Materials, SAE Technical Paper Series, Jeffrey S. Hurley, Buckeye Technologies Inc., dated May 2007.

Notes on Sound Absorption Technology, Uno Ingard (1994).

Chinese Office Action for Chinese application 201680021592.2, dated Oct. 31, 2019.

* cited by examiner

NONWOVEN INFRARED REFLECTIVE FIBER MATERIALS

FIELD

The present teachings relate generally to materials for thermo-acoustic applications, and more specifically, to fibrous composite materials including infrared reflective fibers for reflecting radiation and absorbing sound.

BACKGROUND

Industry is constantly seeking new and/or improved materials and methods of providing sound and noise reduction in a variety of applications. Materials that exhibit sound absorption characteristics are often employed as a way to provide noise reduction in a wide range of industrial, commercial, and domestic applications. It is often desirable to reduce noises of machinery, engines, and the like. For example, in automotive applications, it may be undesirable for a passenger to hear noises coming from the engine compartment of the vehicle.

Traditional sound absorbing materials may have a low temperature resistance, and therefore cannot be installed in areas where the material would be exposed to heat, as they are not capable of withstanding high temperatures. In applications where there are high levels of radiant heat generation, such as within the engine compartment of an internal combustion engine where exhaust and turbo charger components generate significant amounts of thermal radiation, there is a risk that the material will absorb significant amounts of heat and sag, melt, or even catch fire. Certain sound absorbing materials have also been shown to degrade upon exposure to moisture and other engine/powertrain fluids. These sound absorbing materials, therefore, cannot be used alone in all areas where sound absorption is desired.

Therefore, there is a need for improved noise reduction in a variety of applications, such as through improved sound absorption materials. There is also a need for noise reduction, such as through sound absorption materials that can withstand higher temperatures, such as in applications of high levels of radiant heat generation, to provide localized heat reflection, or both.

SUMMARY

The present teachings meet one or more of the above needs by the improved devices and methods described herein.

The present teachings provide for an acoustic material comprising a lofted porous absorber layer, including polymeric fibers having a coating for impeding heat transfer, a facing layer, an optional adhesive layer and an optional PSA layer. The lofted porous bulk absorber layer may include infrared reflective fibers. The facing layer may be air flow resistive. The facing layer may be located adjacent a noise source. The facing layer may be located adjacent a heat source. The facing layer may be attached to a first surface of the lofted porous absorber layer by the adhesive layer. The facing layer may be a scrim, a fabric, a film, or a foil. The facing layer may be a perforated reinforced aluminum foil. The facing layer may be a perforated polymeric film. The facing layer may be a fibrous permeable fabric. The facing layer may be metalized to provide infrared heat reflection. The facing layer may have a thickness of about 0.0001 inches to about 0.25 inches. The facing layer may be attached to a first surface of the lofted porous absorber layer by the adhesive. The adhesive may not plug the perforations of the facing layer. The acoustic material may comprise a pressure sensitive adhesive on a second surface of the lofted porous absorber layer. The pressure sensitive adhesive may include a removable release liner for adhering the acoustic material to a substrate. The acoustic material may reflect heat and provide sound absorption. The coating may be located onto each individual fiber.

The teachings herein further provide for a method of assembling an acoustic material comprising the steps of coating a plurality of polymeric fibers with a coating (which may be a metallic coating), forming a lofted porous absorber layer including the polymeric fibers, and adhering a facing layer onto a first surface of the absorber layer. The method may also include perforating the facing layer or applying an inherently permeable fabric so that the facing layer is permeable. The method may also include attaching a pressure sensitive adhesive material to a second side of the lofted porous absorber layer.

The present teachings may include an acoustic material including acoustically tuned air flow resistive facings and an acoustic lofted absorber based on carded/lapped metallized fibers to enable the acoustic material to reflect heat and to provide broadband sound absorption within the same material.

DETAILED DESCRIPTION

Figure 1:
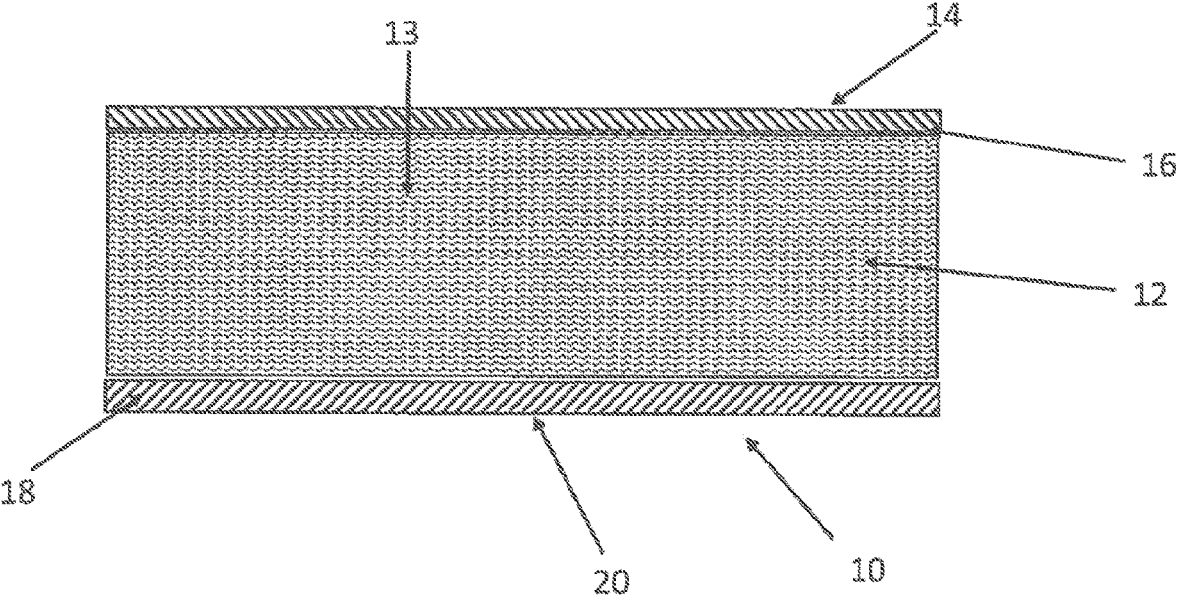
FIG. 1 is a cross-sectional view of a faced nonwoven material in accordance with the present teachings.

This application is related to and claims the benefit of the filing date of U.S. Provisional Application Ser. No. 62/116, 067 filed Feb. 13, 2015, the contents of this application being hereby incorporated by reference for all purposes.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Acoustic materials, such as acoustic composite materials and/or metalized acoustic materials like the materials as discussed herein, may have a wide range of applications, such as where sound absorption and/or insulation are desired. For example, and not to serve as limiting, acoustic materials may be used in automotive applications, generator set engine compartments, commercial vehicle engines, in cab areas, architectural applications, and even heating, ventilating and air conditioning (HVAC) applications. The acoustic materials may be suitable for (but not limited to) use as sound attenuation materials in vehicles, attenuating sound originating from outside a cabin of a motor vehicle and propagating toward the inside of the cabin. Acoustic materials may be used for machinery and equipment insulation, motor vehicle insulation, domestic appliance insulation, dishwashers, and commercial wall and ceiling panels. The acoustic materials may be used in the engine cavity of a vehicle, on the inner and outer dash panels and under the carpeting in the cabin, for example. The acoustic material may be used inside cabs near sheet metal surfaces to provide acoustic absorption and to lower the heat flow between the outside environment and the inside of the vehicle cab (which may also provide a lower demand on the vehicle's HVAC system). The acoustic material may be used as interior decorative trim, in which case it may be necessary to face the acoustic sheet with some form of decorative fabric or other covering. The acoustic sheets may be used in combination with other sound absorption materials. The acoustic material may also be useful as an acoustic pin board material or as a ceiling tile.

Composite products, such as composite acoustic materials, may be formed, at least in part, from porous limp sheets with relatively high air flow resistances, porous bulk absorbers or spacer materials having air flow resistances substantially smaller than the limp sheets, or both. Methods for producing such composite products include those set out in co-owned International Application No. PCT/AU2005/000239 entitled "Thermoformable Acoustic Product" (published as WO/2005/081226), the contents of which is hereby incorporated herein by reference.

In general, materials used for sound absorption (e.g., composite acoustic materials, nonwoven materials, or both) must exhibit air permeability properties. Critical characteristics include air flow resistance (resistance to air flow through the material), tortuosity (the path length of a sound wave within the material), and porosity (void to volume ratio). With fibrous materials, air flow resistance is an overwhelmingly critical factor controlling sound absorption.

Air flow resistance is measured for a particular material at a particular thickness. The air flow resistance is normalized by dividing the air flow resistance (in Rayls) by the thickness (in meters) to derive the air flow resistivity measured in Rayls/m. ASTM standard C522-87 and ISO standard 9053 refer to the methods for determination of air flow resistance for sound absorption materials. Within the context of the described embodiments, air flow resistance, measured in mks Rayls, will be used to specify the air flow resistance; however other methods and units of measurement are equally valid. Within the context of the described embodiments, air flow resistance and air flow resistivity can be assumed to also represent the specific air flow resistance, and specific air flow resistivity, respectively.

The acoustic material as disclosed herein may be a coated fiber acoustic material, and may be a metallic coated fiber acoustic material. The coated fiber acoustic materials may comprise one or more acoustic composite layers. The one or more acoustic composite layers may be or may include a lofted porous bulk absorber, for example. A facing layer or air flow resistive acoustic facing layer may be laminated or otherwise attached to the acoustic composite layer(s). The facing layer may be metalized (e.g., aluminized) on the top surface to provide infrared (IR) radiant heat reflection, which may protect the underneath acoustic composite layer (e.g., the porous bulk acoustic absorber). Fibers located within the porous bulk absorber may be metallized to provide infrared (IR) radiant heat reflection. Therefore, the present teachings envision an acoustically tuned air flow resistive facing and an acoustic composite layer based on carded/lapped metallized fibers or air-layed metallized fibers to reflect heat and to provide broadband sound absorption within the same composite material.

The one or more acoustic composite layers may function to absorb sound to reduce noise. The one or more acoustic composite layers may provide air flow resistance or may exhibit air flow resistance properties. The one or more acoustic composite layers may provide insulation. The one or more acoustic composite layers may support a facing material. The one or more acoustic composite layers may attach directly to a wall or surface of a substrate to provide acoustic absorption. The one or more acoustic composite layers may be any material known to exhibit sound absorption characteristics. The acoustic composite layer may be at least partially formed from fibrous material. The acoustic composite layer may be at least partially formed as a web of material (e.g., a fibrous web). The acoustic composite bulk absorber layer may be formed from nonwoven material, such as short fiber nonwoven materials. The acoustic composite layer may be a porous bulk absorber (e.g., a lofted porous bulk absorber formed by a carding and/or lapping process). The acoustic composite bulk absorber material may be formed by air laying. The acoustic composite layer may be an engineered 3D structure.

Acoustic materials for sound absorption may have a relatively high aft flow resistance to present acoustic impedance to the sound pressure wave incident upon the material. Air permeability should be managed to ensure predictable and consistent performance. This may be achieved through management of fiber sizes, types, fiber coatings and lengths, among other factors. A short metallized fiber nonwoven textile may be desirable. In some applications, desirable levels of air permeability may be achieved by combining plural nonwoven materials of differing densities together to form a composite product. A combination of materials having low permeability with those having high permeability can be used to achieve locally reactive acoustic behavior. One or more of the acoustic materials (e.g., nonwoven materials) may be short fiber technology-based (SFT-based) materials. The SFT-based materials may be formed using gravity deposition or a process similar to air laying. The SFT-based materials may be densified. A SFT-based textile can be advantageous in terms of reducing cost and providing a significant environmental benefit by reducing or eliminating the amount of waste disposed to landfill. The acoustic composite layer may be formed by needle-punching, alone or in combination with any of the methods of forming the layer described herein.

An acoustic composite layer (e.g., nonwoven material) may be formed to have a thickness and density selected according to the required physical and air permeability properties desired of the finished acoustic composite layer. The acoustic composite layer may be any thickness depending on the application, location of installation, shape, fibers used (and the lofting of the acoustic composite layer), or other factors. The density of the acoustic composite layer may depend, in part, on the specific gravity of any additives incorporated into the material comprising the layer (such as nonwoven material), and/or the proportion of the final material that the additives constitute. Bulk density generally is a function of the specific gravity of the fibers and the porosity of the material produced from the fibers, which can be considered to represent the packing density of the fibers.

A low density acoustic composite material may be designed to have a low density, with a finished thickness of about 1.5 mm or more, about 4 mm or more, about 5 mm or more, about 6 mm or more, or about 8 mm or more. The finished thickness may be about 350 mm or less, about 250 mm or less, about 150 mm or less, about 75 mm or less, or about 50 mm or less. The acoustic composite material may be formed as a relatively thick, low density nonwoven, with a bulk density of 10 kg/m³ or more, about 15 kg/m³ or more, or about 20 kg/m³ or more. The thick, low density nonwoven may have a bulk density of about 200 kg/m³ or less, about 100 kg/m³ or less, or about 60 kg/m³ or less. The acoustic composite material thus formed may have an air flow resistivity of about 400 Rayls/m or more, about 800 Rayls/m or more, or about 100 Rayls/m or more. The acoustic composite material may have an air flow resistivity of about 200,000 Rayls/m or less, about 150,000 Rayls/m or less, or about 100,000 Rayls/m or less. Low density acoustic composite materials may even have an air flow resistivity of up to about 275,000 Rayls/m. Additional sound absorption may also be provided by a facing layer on the acoustic composite layer (e.g., by laminating or otherwise attaching or adhering to a surface of the acoustic composite layer). A facing layer may include air flow resistive fabrics or films that may provide an air flow resistivity of about 275,000 Rayls/m or higher, 1,000,000 Rayls/m or higher, or even 2,000,000 Rayls/m or higher. For example, a facing layer may have a thickness that is about 0.0005 m thick and may have a specific air flow resistance of about 1000 Rayls. Therefore, the air flow resistivity would be about 2,000,000 Rayls/m. In another example, a fabric or film facing layer may have a thickness of about 0.0005 inches, or about 0.013 mm, with a specific air flow resistance of about 1000 Rayls. Therefore air flow resistivity would be about 7,700,000 Rayls/m.

Where the acoustic composite material is a low density material (such as a nonwoven material), the nonwoven material may be used as a porous bulk absorber. In order to form a porous bulk absorber of the desired dimensions, once the nonwoven material is formed, the nonwoven material may be vertically lapped, rotary lapped, or air laid and then thermally bonded. High density nonwoven materials may also be used for a variety of applications, such as, for example, a porous limp sheet. The low and high density nonwoven materials may be used together to form composite materials or products.

The acoustic composite layer material fibers that make up the acoustic composite material/layer may have a linear mass density from about 0.5 to about 25 denier, preferably about 1 to about 6 denier, more preferably about 1 to about 4 denier. The fibers may have a staple length of about 1.5 millimeters or greater, or even up to about 70 millimeters or greater (e.g., for carded fibrous webs). For example, the length of the fibers may be between about 30 millimeters and about 65 millimeters, with an average or common length of about 50 or 51 millimeters staple length, or any length typical of those used in fiber carding processes. Short fibers may be used in some other nonwoven processes, such as the formation of air laid fibrous webs. For example, some or all of the fibers may be a powder-like consistency (e.g., with a fiber length of about 2 millimeters to about 3 millimeters). Fibers of differing lengths may be combined to form the acoustic composite layer. The fiber length may vary depending on the application, the acoustic properties desired, dimensions and/or properties of the acoustic material (e.g., density, porosity, desired air flow resistance, thickness, size, shape, and the like of the acoustic layer), or any combination thereof. More effective packing of the shorter fibers may allow pore size to be more readily controlled in order to achieve desirable acoustic characteristics. The fibers may be coated with a metallic material. The fibers may be coated with an aluminum material.

The fibers of the acoustic composite layer material may be natural or synthetic fibers. Suitable natural fibers may include cotton, jute, wool, cellulose and ceramic fibers. Suitable synthetic fibers may include polyester, polypropylene, polyethylene, Nylon, aramid, imide, acrylate fibers, or combination thereof. The acoustic composite layer material may comprise polyester fibers, such as polyethylene terephthalate (PET), and co-polyesterlpolyester (CoPET/PET) adhesive bi-component fibers. The fibers are preferably a polymeric material that has been metallized for providing thermal resistance. The fibers may be 100% virgin fibers, or may contain fibers regenerated from postconsumer waste (for example, up to about 90% fibers regenerated from postconsumer waste).

The acoustic composite layer material may include a plurality of bi-component fibers. Such bi-component fibers may also be metallized. The bi-component fibers may include a core material and a sheath material around the core material. The sheath material may have a lower melting point than the core material. The web of fibrous material may be formed, at least in part, by heating the material to a temperature to soften the sheath material of at least some of the bi-component fibers. The temperature to which the fibrous web is heated to soften the sheath material of the bi-component may depend upon the physical properties of the sheath material. For a polyethylene sheath, the temperature may be about 140 degrees C. to about 160 degrees C. For a polypropylene sheath, the temperature may be higher (for example, about 180 degrees C.). The bi-component fibers may be formed of short lengths chopped from extruded bi-component fibers. The bi-component fibers may have a sheath-to-core ratio (in cross-sectional area) of about 25% to about 35%.

To provide heat reflective properties and protect the acoustic layer, the fibers may be metalized or aluminized. The fibers themselves may be infrared reflective (e.g., so that an additional metallization or aluminization step may not be necessary). Metallization or aluminization processes can be performed by depositing metal atoms onto the fibers. As an example, aluminization may be established by applying a layer of aluminum atoms to the surface of fibers. Metalizing may be performed prior to the application of the facing to the acoustic layer.

The metallization may provide a desired reflectivity or emissivity. The metallized fibers may be about 50% IR reflective or more, about 65% IR reflective or more, or about 80% IR reflective or more. The metallized fibers may be about 100% IR reflective or less, about 99% IR reflective or less, or about 98% IR reflective or less. For example, the emissivity range may be about 0.01 to about 0.20, or 99% to about 80% IR reflective, respectively. Emissivity may change over time as oil, dirt, degradation, and the like may impact the fibers in the application.

Other coatings may be applied to the metallized fibers to achieve desired properties. For example, a corrosion resistant coating may be applied to the metalized fibers to reduce or protect the metal (e.g., aluminum) from oxidizing and/or losing reflectivity.

The fibers may be used to form a thermoformable short fiber nonwoven, which indicates a nonwoven material that may be formed with a broad range of densities and thicknesses and that contains a thermoplastic and/or thermoset binder. The thermoformable short fiber nonwoven material may be heated and thermoformed into a specifically shaped thermoformed product.

The acoustic composite layer fibers may be blended or otherwise combined with suitable additives such as other forms of recycled waste, virgin (non-recycled) materials, binders, fillers (e.g., mineral fillers), adhesives, powders, thermoset resins, coloring agents, flame retardants, longer staple fibers, etc., without limitation.

The ability of the acoustic materials to absorb sound may be enhanced by applying a facing layer to the top surface of the one or more acoustic composite layers (e.g., a lofted porous bulk absorber). The acoustic composite layer may be protected by the facing layer. The facing layer may function to provide additional air flow resistance. The facing layer (e.g., a metallic facing layer or via the metallization of the facing layer) may function to provide heat resistance, heat reflection, support, protection, or combination thereof, to the acoustic composite layer (and the acoustic material in general). The facing layer may face the noise and/or heat source, thereby serving as a barrier between the noise and/or heat source and the acoustic composite layer (e.g., a lofted porous bulk absorber). The facing layer may have a thickness of about 0.0001 inch or more, about 0.0002 inches or more, or about 0.0005 inches or more. The facing layer may have a thickness of about 0.5 inches or less, about 0.3 inches or less, or about 0.25 inches or less.

To maintain good acoustic performance, the facing layer may preferably be a permeable material so that sound is not just reflected off of the facing layer and can travel to the acoustic composite layer. The facing layer may be formed from a nonwoven, preformed web; fabric; needle-punched material; the like; or combination thereof. The facing layer may be a nonwoven material. The facing layer may instead be a woven material, such as a woven fabric. The facing layer may be a permeable scrim. The scrim may be formed of a fibrous permeable fabric. The facing layer may be a generally solid layer (e.g., a metallic layer or a film) made permeable by forming a plurality of openings. The facing layer may be made permeable by methods of creating openings in the layer, such as by perforation, which may permit a greater range of materials to be used as a facing layer. The perforation, for example, of a generally solid layer may then enable permeability for good acoustic absorption properties. The facing layer may be a film applied to the acoustic composite layer. The film may be a reflective film. The film may be any polymeric film capable of being metalized, for example a polyester (e.g., PET) film. The facing layer may be a toil (e.g., a metallic toil). The foil may be laminated to the acoustic composite layer. For example, the foil may be a laminated reinforced aluminum foil. The film or foil may be perforated prior to or after being applied to the acoustic composite layer.

The openings in the facing layer, e.g., formed by perforation or the openings of a scrim, may be spread across the entire facing layer. The openings or perforations may be generally concentrated in particular areas of the facing layer (e.g., areas where permeability and/or air flow resistance are desired). The perforations may be created in any design or pattern that provides permeability to the lacing layer. For example, the perforations may be aligned in rows and/or columns over the facing layer (e.g., creating a generally uniform pattern along the facing layer). The perforations may be arranged in a staggered pattern. The perforations may create open space accounting for approximately 0.1 percent or more of the facing layer, about 1 percent or more of the facing layer, or about 4 percent or more of the facing layer. The perforations may create open space accounting for about 90 percent of the facing layer or less, about 40 percent of the facing layer or less, or about 25 percent of the facing layer or less. The facing layer may be applied over the non-reflective acoustic composite material to provide localized heat reflection without considerably sacrificing the properties of the underneath acoustic composite material and without reducing the acoustic absorption capacity of the existing base material (the one or more acoustic composite layers).

In assembling the layers as disclosed herein, the facing layer may be laminated to the lofted porous bulk absorber. The facing layer may be bonded to the acoustic composite layer with an adhesive, such as a high temperature adhesive layer. The adhesive may be a powder adhesive, an adhesive web or film, a liquid adhesive, or any combination thereof. It may be preferable that the high temperature adhesive layer does not plug the openings of the permeable facing layer so that the facing layer remains permeable for good acoustic properties and to allow the acoustic composite layer to absorb sound. Perforating and/or metalizing/aluminizing steps may be performed prior to the lamination of the facing layer to the acoustic composite layer. Perforating, metalizing/aluminizing, or both, may be performed after the lamination of the facing layer to the acoustic composite layer.

The acoustic material may be tuned for broadband acoustic absorption based on the permeability or specific air flow resistance of the facing layer and the makeup of the acoustic composite layer (e.g., a lofted porous bulk absorber) underneath. The acoustic material may also be designed to provide IR heat reflection by use of the metallized fibers. This allows the acoustic material to be installed and used in applications with high temperature areas with localized radiant heat sources. The acoustic material may have a temperature resistance for the intended application. For certain automotive applications, for example, the acoustic material may have a low sag modulus at temperature up to about 150° Celsius or even greater. In engine compartment applications, the acoustic material may exhibit minimal sag at operating temperatures.

Acoustic properties of the acoustic material may be impacted by the shape of the acoustic material. The acoustic material may be generally flat. The acoustic material may be formed into any shape. For example, the acoustic material may be molded to generally match the shape of the area to which it will be installed. The three-dimensional geometry of a molded product may provide additional acoustic absorption. The three-dimensional shape may provide structural rigidity and an air space. Such a shape may also form partially enclosed cells, such as a honeycomb or egg-carton type structure, that may provide local reactivity and increase the acoustical performance of the thermo-formed acoustic material.

The acoustic material may be provided with a pressure sensitive adhesive (PSA). The PSA may be applied from a roll and laminated to the back side of the acoustic composite layer material (e.g., on the side of the acoustic composite layer opposite the facing layer), which may be performed concurrently with the lamination of the facing layer. A release liner may carry the PSA. Prior to installation of the acoustic material, the release liner may be removed from the pressure sensitive adhesive to allow the composite sound absorber to be adhered to a panel, substrate, or surface. For some acoustic materials intended to be used as input components, for example on a vehicle production line, it is desirable that the acoustic material can be installed quickly and easily. To achieve this, for some applications, it may be beneficial to provide a release liner with a high tear strength that is easy to remove.

The PSA may be provided as part of a tape material comprising: a thin flexible substrate; a PSA substance carded on a single side of the substrate, the PSA substance being provided along a length of the substrate (e.g., in an intermittent pattern or as a complete layer); and optionally a mesh carried on the single side. The PSA may be coated onto a silicone coated plastic or paper release liner. The PSA may be of the supported design, where the PSA layer may be bonded to a carder film, and the carrier film may be bonded to the acoustic composite layer. A thin flexible substrate may be located on the side of the PSA layer opposite the carrier film. The end user may then remove the thin flexible substrate (e.g., release liner) to install the part to the target surface. The supported construction may be up to 100% coverage, or the PSA may be supplied in an intermittent pattern. The supported construction may include embedded mesh.

The purpose of the substrate of the tape material is to act as a carder for the PSA substance so that the PSA substance can be applied (adhered) to the sound absorbing material. The substrate further acts as the release liner and can be subsequently removed by peeling it away, leaving the PSA substance exposed on the side where the substrate used to be. The newly exposed face of the PSA substance can be applied to a target surface, for example such as a panel or surface, to adhere the composite sound absorber to the target surface.

The entire side (e.g., about 100%) of the side of the acoustic material may be coated with the PSA. If provided in an intermittent PSA coating, depending on the size and spacing of the applied portions of the intermittent PSA coating, the percentage of coated area can be varied. The applied area of the coating can vary between about 10 and about 90%, or more specifically about 30% to about 40%, of the area of the substrate, for example.

The intermittent coating may be applied in strips or in another pattern. This can be achieved by hot-melt coating with a slot die, for example, although it can also be achieved by coating with a patterned roller or a series of solenoid activated narrow slot coating heads, for example, and may also include water and solvent based coatings, in addition to hot melt coating.

Where the PSA coating is applied in strips, the spacing of the strips may vary depending on the properties of the acoustic material. For example, a lighter acoustic material may need less PSA to hold the material in place. A wider spacing or gap between the strips can facilitate easier removal of the substrate, as a person can more readily find uncoated sections that allow an edge of the substrate to be lifted easily when it is to be peeled away to adhere the sound absorbing material to another surface.

By applying the adhesive in an intermittent pattern, such as longitudinal strips, it is possible to still achieve the coating weight desired for a particular application, while saving a large percentage of the RSA resin by coating only some portions of the total area. Thus, it may be possible to use a reduced amount of PSA substance because the sound absorbing material of certain embodiments is a lightweight and porous article that does not require an all-over coating. Lowering the overall amount of PSA used also has the effect of minimizing the toxic emissions and volatile organic compounds (VOC) contributed by the RSA substance used to adhere the sound absorbing material to a target surface. The described acrylic resin used for the PSA also has relatively low VOC content.

The pressure sensitive adhesive substance may be an acrylic resin that is curable under ultraviolet light, such as AcResin type DS3583 available from BASF of Germany. A PSA substance may be applied to substrate in a thickness of about 10 to about 150 microns, for example. The thickness may alternatively be from about 20 to about 100 microns, and possibly from about 30 to about 75 microns, for example.

Other types of PSA substance and application patterns and thicknesses may be used, as well as PSA substances that can be cured under different conditions, whether as a result of irradiation or another curing method. For example, the PSA substance may comprise a hot-melt synthetic rubber-based adhesive or a UV-curing synthetic rubber-based adhesive.

Turning now to the figures, FIG. 1 illustrates a cross section of an acoustic material 10, which is a metalized fiber acoustic material. The acoustic material 10 comprises an acoustic bulk absorber 12, including metallized fibers 13 located therein. A facing layer 14 is attached to the acoustic bulk absorber layer 12 by an adhesive layer 16, which may be a high temperature adhesive layer. On the opposing side of the acoustic bulk absorber layer 12 is an optional layer of pressure sensitive adhesive 18. The pressure sensitive adhesive 18 can be exposed by removing the release liner 20, which allows for peel-and-stick functionality so that the acoustic material 10 can be attached to a substrate to provide acoustic and IR reflective properties.

Figure 2:
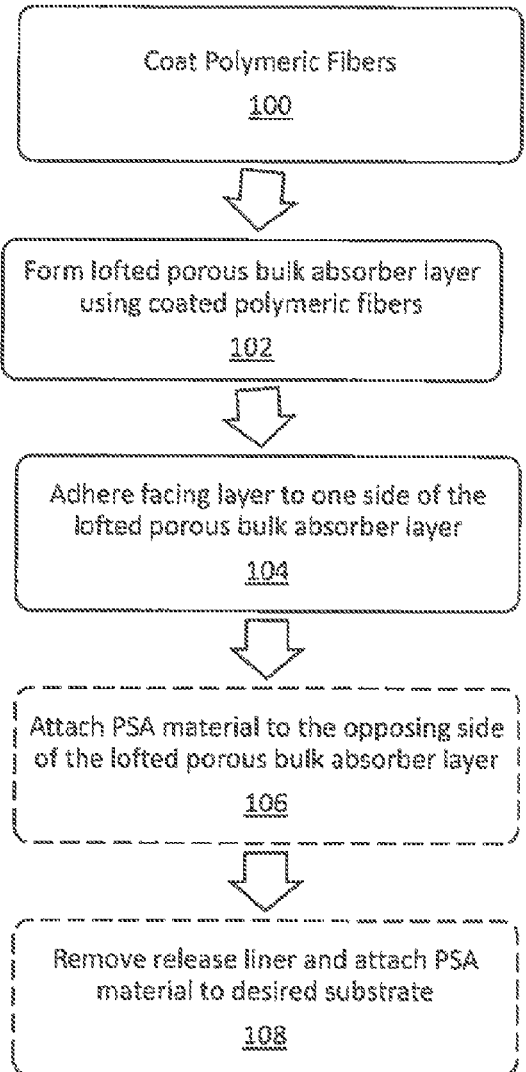
FIG. 2 is a flow chart illustrating a method of assembling a faced nonwoven material in accordance with the present teachings.

FIG. 2 is a flow chart illustrating the steps of assembling and attaching the acoustic material of FIG. 1. Step 100 includes coating the polymeric fibers. Step 102 includes forming the lofted porous bulk absorber based on carded/lapped fiber technology that exhibits the desired air flow resistive properties. Depending on the material of the facing layer, the modification step may include perforating the facing layer so that the facing layer is permeable. Step 104 includes adhering the facing layer to one side of the acoustic bulk absorber layer. Adhering may be achieved by a high temperature adhesive layer between the facing layer and the acoustic bulk absorber by layer, laminating, or both. Optionally, pressure sensitive adhesive material may be adhered to the opposing side of the acoustic bulk absorber layer, as shown in step 106. The PSA material may have a release liner that can be removed to attach the PSA material (as well as the acoustic bulk absorber layer and facing layer) to a substrate, as shown in step 108, which provides peel and stick functionality.

Parts by weight as used herein refers to 100 parts by weight of the composition specifically referred to. Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32, etc. are expressly enumerated in this specification. For values which are less than one, one unit is considered to be 0.0001, 0.001, 0.01, or 0.1 as appropriate. These are only examples of what is specifically intended and all possible combinations of numerical values between the lowest value, and the highest value enumerated are to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. An acoustic material comprising:
   a) a nonwoven carded and vertically lapped layer, including:
   i) polymeric fibers having a metallic coating located thereon that impedes heat transfer, wherein the polymeric fibers having a metallic coating located thereon are dispersed throughout the entire thickness of the nonwoven and vertically lapped layer, wherein the entirety of the polymeric fibers have an average staple length of about 30 mm to about 70 mm; and
   ii) bi-component fibers including a core material and a sheath material, wherein the sheath material has a lower melting point than the core material; and
   wherein the nonwoven carded and vertically lapped layer includes a plurality of nonwoven materials of differing densities to form a composite product with a desirable level of air permeability;
      b) a permeable facing layer directly secured to the nonwoven carded and vertically lapped layer, wherein the permeable facing layer is attached to a first surface of the nonwoven carded and vertically lapped layer by an adhesive layer, and wherein the adhesive layer does not plug perforations of the permeable facing layer, and wherein the permeable facing layer is aluminized to provide infrared heat reflection; and
      c) a pressure sensitive adhesive layer located on an opposing second surface of the nonwoven carded and vertically lapped layer, wherein the pressure sensitive adhesive layer includes a removable release liner for adhering the acoustic material to a substrate;
   wherein the acoustic material reflects heat and provides acoustic absorption;
   wherein the nonwoven carded and vertically lapped layer has a bulk density of about 40 kg/m³ or less and an air flow resistivity of about 275,000 Rayls/m or less; and
   wherein the acoustic material is adapted for use within an engine compartment.

2. The acoustic material of claim 1, wherein the bi-component fibers are metallized.

3. The acoustic material of claim 1, wherein the permeable facing layer has an air flow resistance of about 600 Rayls to about 1800 Rayls.

4. The acoustic material of claim 1, wherein the permeable facing layer is an outermost layer configured to be located adjacent a noise source.

5. The acoustic material of claim 1, wherein the permeable facing layer is a scrim, a fabric, a film, or a foil.

6. The acoustic material of claim 5, wherein the permeable facing layer is a perforated reinforced aluminum foil.

7. The acoustic material of claim 5, wherein the permeable facing layer is a perforated polymeric film.

8. The acoustic material of claim 5, wherein the permeable facing layer is a fibrous permeable fabric.

9. The acoustic material of claim 1, wherein the permeable facing layer has a thickness of about 0.003 mm to about 0.009 mm.

10. The acoustic material of claim 1, wherein the pressure sensitive adhesive layer is applied in longitudinal strips along the second surface, and the pressure sensitive adhesive layer is an acrylic resin that is curable under ultraviolet light.

11. The acoustic material of claim 1, wherein the permeable facing layer includes openings aligned in rows and/or columns across the permeable facing layer that account for about 40 percent of the facing layer or less.

12. An acoustic material comprising:
   a) a nonwoven carded and vertically lapped layer, including:
   i) polymeric fibers having an aluminum coating that impedes heat transfer, wherein the polymeric fibers having an aluminum coating are dispersed throughout the entire thickness of the nonwoven and vertically lapped layer, wherein the entirety of the polymeric fibers have an average staple length of about 30 mm to about 70 mm; and
   ii) bi-component fibers including a core material and a sheath material, wherein the sheath material has a lower melting point than the core material, wherein the polymeric fibers include a corrosion resistant coating applied to the aluminum coating;
      b) a permeable facing layer directly secured to a first surface of the nonwoven carded and vertically lapped layer by lamination, adhesive, or both, wherein the permeable facing layer is a scrim, a fabric, a film, or a foil; and
      c) a pressure sensitive adhesive layer on an opposing second surface of the nonwoven carded and vertically lapped layer; and
   wherein the permeable facing layer is a metalized outer layer configured to provide infrared heat reflection;
   wherein the permeable facing layer has a thickness of about 0.003 mm to about 0.009 mm;
   wherein the permeable facing layer includes openings that create open space accounting for about 90 percent of the facing layer or less;
   wherein the acoustic material reflects heat and provides acoustic absorption;
   wherein the nonwoven carded and vertically lapped layer has a bulk density of about 40 kg/m3 or less and an air flow resistivity of about 275,000 Rayls/m or less; and
   wherein the acoustic material is adapted for use within an engine compartment.

13. The acoustic material of claim 12, wherein the permeable facing layer is attached to a first surface of the nonwoven carded and vertically lapped layer by an adhesive layer, and wherein the adhesive layer does not plug perforations of the permeable facing layer.

14. The acoustic material of claim 12, wherein the pressure sensitive adhesive layer includes a removable release liner for adhering the acoustic material to a substrate.

15. The acoustic material of claim 12, wherein the nonwoven carded and vertically lapped layer includes a plurality of nonwoven materials of differing densities to form a composite product with a desirable level of air permeability.

16. The acoustic material of claim 12, wherein the openings create open space accounting for about 40 percent of the permeable facing layer or less.

17. An acoustic material consisting of:

a) a nonwoven carded and vertically lapped layer, including:

i) polymeric fibers having a metallic coating located thereon that impedes heat transfer, wherein the polymeric fibers having a metallic coating located thereon are dispersed throughout the entire thickness of the nonwoven carded and vertically lapped layer, wherein the entirety of the polymeric fibers have an average staple length of about 30 mm to 70 mm; and ii) bi-component fibers including a core material and a sheath material, wherein the sheath material has a lower melting point than the core material;

b) an outermost permeable facing layer directly secured to the nonwoven carded and vertically lapped layer by lamination, adhesive, or both, wherein the permeable facing layer is aluminized to provide infrared heat reflection; and c) a pressure sensitive adhesive layer;

wherein the acoustic material reflects heat and provides acoustic absorption;

wherein the nonwoven carded and vertically lapped layer has a bulk density of about 60 kg/m3 or less and an air flow resistivity of about 275,000 Rayls/m or less; and wherein the acoustic material is adapted for use within an engine compartment.

18. The acoustic material of claim 17, wherein the permeable facing layer is a scrim, a fabric, a film, or a foil.

19. The acoustic material of claim 17, wherein the nonwoven carded and vertically lapped layer includes a plurality of nonwoven materials of differing densities to form a composite product with a desirable level of air permeability.

20. The acoustic material of claim 17, wherein the permeable facing layer is attached to a first surface of the nonwoven carded and vertically lapped layer by the adhesive.

\* \* \* \* \*